United States Patent [19]

Folkers

[11] Patent Number: 4,519,637
[45] Date of Patent: May 28, 1985

[54] PIPE COUPLING

[75] Inventor: Joie L. Folkers, Wichita Falls, Tex.

[73] Assignee: Ameron Inc., Monterey Park, Calif.

[21] Appl. No.: 425,709

[22] Filed: Sep. 28, 1982

[51] Int. Cl.³ .............................................. F16L 17/00
[52] U.S. Cl. .................................... 285/113; 285/371; 285/238; 285/398
[58] Field of Search ................. 285/15, 371, 398, 370, 285/357, 238, 373, 112, 113

[56] References Cited

U.S. PATENT DOCUMENTS

| | | | |
|---|---|---|---|
| 740,664 | 10/1903 | Kroll | 285/371 X |
| 1,683,415 | 9/1928 | Selah | |
| 2,091,085 | 8/1937 | Scholtes | 285/86 |
| 2,383,692 | 8/1945 | Smith | 285/123 |
| 2,459,956 | 1/1949 | Muller | 285/123 |
| 2,588,827 | 3/1952 | Gouch | 285/123 |
| 2,814,508 | 11/1957 | Seamark | 285/95 |
| 2,837,353 | 6/1958 | Ashbrook | 285/106 |
| 2,962,305 | 11/1960 | McCarthy et al. | 285/112 |
| 3,118,692 | 1/1964 | Fitzhugh | 285/238 |
| 3,494,639 | 2/1970 | Smith | 285/370 X |
| 3,754,781 | 8/1973 | Conroy | 285/322 |
| 3,815,940 | 6/1974 | Luckenbill | 285/105 |
| 3,986,731 | 10/1976 | DeHoff | 285/81 |
| 4,130,302 | 12/1978 | Mitchell et al. | 285/113 |
| 4,186,947 | 2/1980 | Nixon | 285/112 |
| 4,300,792 | 11/1981 | Donnelly | 285/112 |
| 4,326,737 | 4/1982 | Lehmann | 285/112 |

FOREIGN PATENT DOCUMENTS

| | | |
|---|---|---|
| 914803 | 7/1954 | Fed. Rep. of Germany . |
| 2801485 | 7/1979 | Fed. Rep. of Germany . |
| 41089 | 8/1932 | France . |
| 545972 | 6/1942 | United Kingdom . |

Primary Examiner—Richard J. Scanlan, Jr.
Attorney, Agent, or Firm—Shapiro and Shapiro

[57] ABSTRACT

A repair coupling is herein disclosed which is particularly suited for use with fiber-reinforced thermosetting resin pipe. The coupling comprises a pair of inner and outer sleeves to be secured on respective end portions of a pair of pipe sections to be coupled, a tubular seal carrier, and a clamp. Each inner sleeve is axially slit and has a tapered external thread. Each outer sleeve has a complementary internal thread. The inner sleeves have internal teeth so that threading of the outer sleeves onto the inner sleeves causes the teeth to grip the respective pipe end to secure the inner and outer sleeves thereto. The seal carrier has opposed seal-carrying sections which fit into the respective pipe ends and form internal fluid seals, and a flange between the seal-carrying sections forming a spacer between the adjacent pipe ends. The outer sleeves each have an external groove and the clamp, which comprises a pair of bolt-together semi-cylindrical clamp portions, has internal ribs spaced apart so as to fit in the respective grooves when the adjacent ends of the outer sleeves engage opposite surfaces of the flange. The coupling is readily applied in situ without the need for special equipment.

10 Claims, 4 Drawing Figures

PIPE COUPLING

BACKGROUND OF THE INVENTION

This invention relates to pipe couplings and more particularly to repair couplings for non-metallic pipe such as fiberglass-reinforced thermosetting resin pipe and the like.

The maintenance of any piping system requires the availability of a repair coupling for damage or failures which may occur in the system during installation or service. Ideally, couplings of this nature should be simple to install in the field, without the need for specialized equipment, and should be reliable in providing efficient, substantially leak-free connection between adjacent pipe sections. The present invention seeks to provide such a coupling particularly adapted to use with plastic pipe of the type aforesaid.

SUMMARY OF THE INVENTION

In one of its broader aspects, the invention provides a pipe coupling comprising first and second sleeve means adapted to be secured around respective end portions of a pair of pipe sections to be coupled, sealing means for preventing leakage of fluid between the coupled pipe sections, and clamp means for holding the pipe sections together, wherein each of the sleeve means includes an axially slit inner sleeve with an external tapered thread and an outer sleeve with an internal tapered thread complementary to the external thread on the inner sleeve, the inner sleeve having internal teeth adapted to grip the surface of the respective pipe section for securing the inner sleeve thereto when the outer sleeve is threaded onto the inner sleeve, and the clamp means and outer sleeves having inter-engaging portions for resisting separation of the respective sleeve means and pipe sections.

In accordance with a further aspect of the invention, there is provided a pipe coupling comprising a tubular seal carrier having opposed seal-carrying sections adapted to enter respective end portions of a pair of pipe sections which are to be coupled and to form a fluid seal with interior surfaces of the respective pipe sections while permitting flow therethrough, and a radially outwardly extending flange between the seal-carrying sections for providing a spacer between adjacent ends of the respective pipe sections, the coupling further including first and second sleeve means adapted to be secured respectively around the respective end portions of the pipe sections with adjacent ends of the respective sleeve means engaging opposite surfaces of said flange respectively, and a clamp means for positioning around the sleeve means for holding the sleeve means and pipe sections together, the clamp means and sleeve means having inter-engaging portions adapted to fit together for resisting separation of the pipe sections when the adjacent ends of the respective sleeve means engage opposite surfaces of the flange.

Additional features of the invention and advantages attendant to its use with plastic pipe will become apparent from the ensuing description and claims read in conjunction with the attached drawings.

DESCRIPTION OF PREFERRED EMBODIMENT

Figure 1:
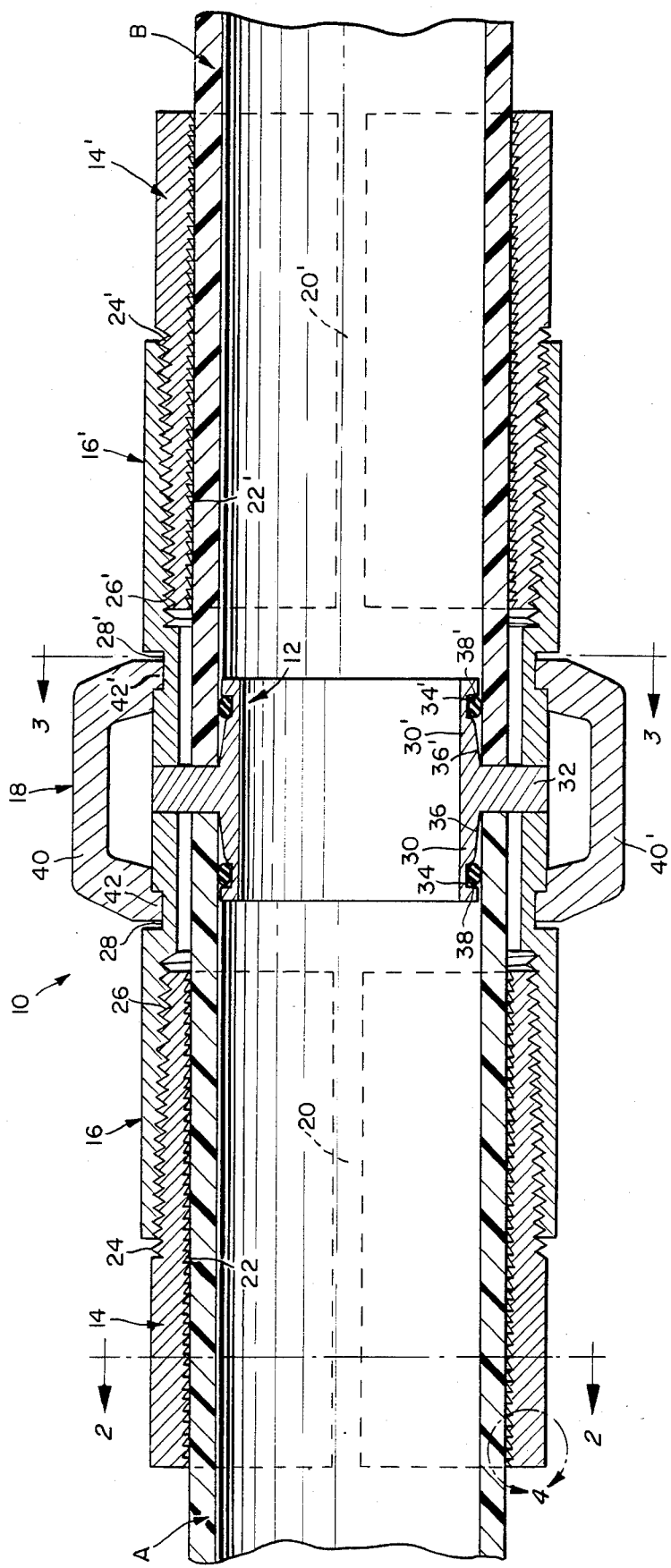
FIG. 1 is a longitudinal sectional view through a pipe coupling in accordance with the invention.

FIG. 1 of the drawings shows end portions A and B of a pair of pipe sections (for example fiber-glass-reinforced thermosetting resin pipe sections) which have been coupled by a pipe coupling 10 in accordance with the invention. Components of the coupling comprise a seal carrier 12, a pair of like inner sleeves 14 and 14' secured around the respective end portions A and B, a pair of like outer sleeves 16 and 16' embracing the respective inner sleeves, and a clamp means 18.

Figure 2:
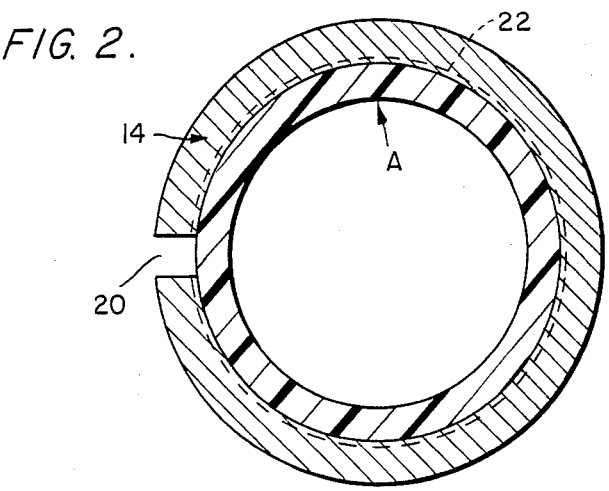
FIG. 2 is a cross-section on line 2—2 of FIG. 1.
Figure 4:
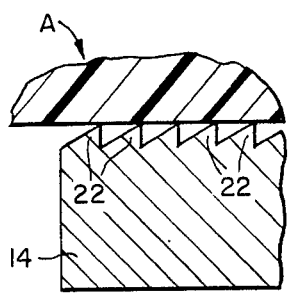
FIG. 4 is an enlarged detail view of a part of one of the coupling components.

Inner sleeves 14 and 14', which may be made of metal, are axially slit along their entire length as at 20, 20' (see also FIG. 2) and have internal teeth 22, 22' or like serrations (see FIG. 4) which grip the outer surface of a respective pipe section to secure the respective sleeve thereto when the sleeve is tightened down by contraction of the slit. (For a pipe of about 2 inches O.D., the width of the slit may be about ¼ inch.) The inner sleeves are each provided with a tapered external thread 24, 24' and the outer sleeves 16 and 16', which may be also made of metal have internal tapered threads 26, 26' complementary to threads 24 and 24'. It will be appreciated that threading an inner and outer sleeve together thus serves to contract the slit in the inner sleeve and tighten the sleeve onto its respective pipe section. Adjacent the internal thread, each outer sleeve is provided with an external circumferential groove 28, 28'.

Seal carrier 12, which may be of metal or fiberglass reinforced plastic, has opposed seal-carrying sections 30, 30' with a radially outwardly extending flange 32 therebetween. Each of the seal-carrying sections includes a groove 34, 34' and a surface 36, 36' which tapers outwardly (e.g. at an angle of about 5°) toward flange 32. O-ring seals 38, 38' are located in the respective grooves. The diameter of each O-ring is preferably such that when sections 30, 30' are inserted into the respective pipe ends, the O-rings are somewhat compressed against the inner pipe surfaces (e.g. to about 25% of their available compression) to provide a seal against vacuum internally of the pipe and against external pressure. Additionally, should internal pipe pressure increase, the O-rings may be wedged along surfaces 36, 36' to provide a tighter seal.

Figure 3:
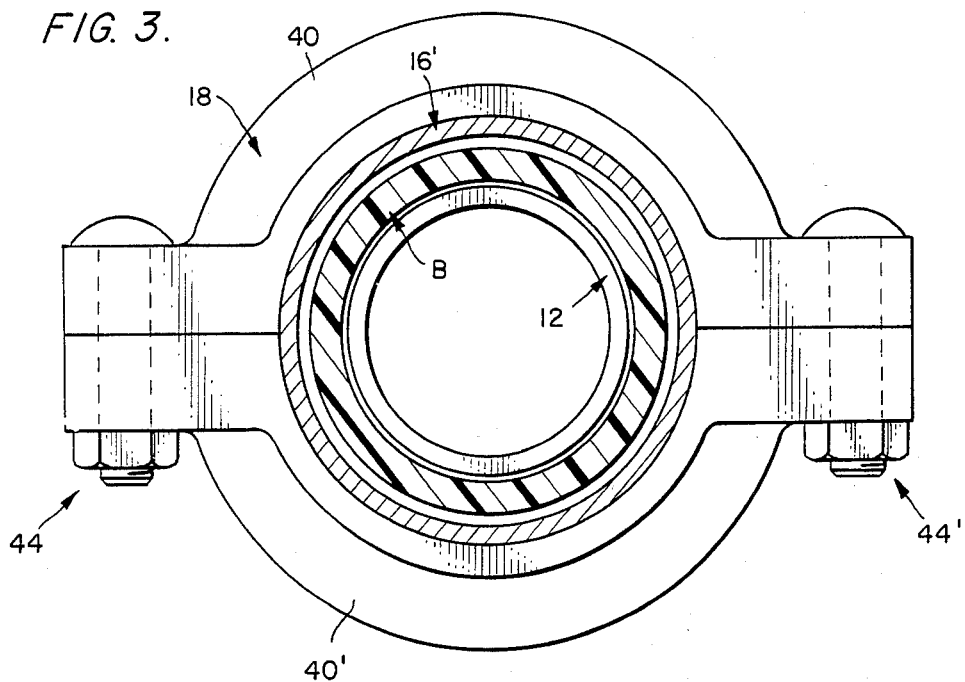
FIG. 3 is a cross-section on line 3—3 of FIG. 1.

Clamp means 18 may comprise a conventional form of pipe clamp having a pair of semi-circular portions 40, 40', (see FIG. 3) fastened together by nuts and bolts 44, 44' or the like. Internally, the clamp portions 40, 40' are formed with circumferential ribs 42, 42' (FIG. 1) which engage in grooves 28, 28'. The combination of sleeve teeth 22, 22' threads 24, 26, 24', 26', grooves 28, 28' and ribs 42, 42', provides the coupling with external thrust restraint resisting separation of the sleeves and pipe sections. It will be noted that in the assembled coupling the adjacent ends of outer sleeves 16, 16' are substantially flush with the adjacent ends of the respective pipe sections and engage opposite surfaces of flange 32 which forms a spacer between the pipe sections. This provides a convenient means for accurately locating ribs 42, 42' in grooves 28, 28', the spacing between the ribs corresponding to the sum of the distances of the grooves from the respective sleeve ends plus the thickness of flange 32. Thus, when the sleeve ends are brought into engagement with the opposite surfaces of flange 32, the ribs will engage accurately in the grooves.

Assembly of a coupling in accordance with the invention may be effected in the following manner. First, inner sleeves 14, 14' are positioned on the respective pipe end portions A and B, and the outer sleeves loosely threaded in place, the positioning of the sleeves being such that the free ends of the outer sleeves will be substantially flush with the respective pipe ends when the threads are tightened. (Initially, the free ends of the outer sleeves may project somewhat from the pipe ends.) The inner sleeves may then be tightened to the outer sleeves using a conventional pipe wrench or the like, in order to tighten the teeth of the inner sleeves onto the respective pipe sections. The sleeves are manipulated such that when fully tightened, the free ends of the outer sleeves are substantially flush with the pipe ends. A seal-carrying section of seal carrier 12 is then inserted into one pipe section until flange 32 engages the free end of the respective outer sleeve. This step is repeated with the other pipe section and the other seal-carrying section of carrier 12. The grooves 28, 28' in the outer sleeves are then properly positioned to receive the ribs 42, 42' of clamp portions 40, 40', which may then be applied and bolted together to complete the coupling.

It will be seen that the invention provides a coupling which may be expeditiously applied in situ without the use of specialized equipment and without requiring any tapering, bonding, or rotation of a pipe being repaired.

It will be noted that in the subject coupling sealing is effected internally of the pipe while thrust restraint is effected externally. These attributes make the coupling particularly suitable for use with fiber-reinforced plastic pipe which is wound on a mandrel and wherein, therefore, the inside diameter of the pipe, against which the coupling seal is effected, is generally more accurately sized than the outer diameter. (The coupling moreover is well adapted, due to the slit nature of the inner sleeves, to accommodate fluctuations in outer pipe diameter.) Further, most pipe of the kind referred to is made in layers, so that exposure of a cut pipe end renders a pipe susceptible to absorbption of fluid by interlaminar penetration. In the subject coupling, the cut pipe ends are not generally exposed to fluid, so that the susceptibility to absorbtion is substantially reduced.

Couplings in accordance with the invention may be used singly to repair small pipe defects, or they may be used in pairs, at ends of a replacement pipe section, for larger repairs. While the invention has been particularly described in connection with its application as a repair coupling for fiber-reinforced thermosetting resin pipes, it may also be applied in couplings for other applications. Additionally, while the invention has been described herein with reference to a single preferred embodiment thereof, the invention is not limited thereby and variations may be made within the scope of the attached claims.

I claim:

1. A pipe coupling comprising first and second sleeve means adapted to be secured around respective end portions of a pair of pipe sections to be coupled, sealing means for providing fluid seals around the interior surfaces of the respective pipe sections, and clamp means for holding the sleeve means together, wherein each of the sleeve means includes an axially slit inner sleeve with an external tapered thread and an outer sleeve with an internal tapered thread complementary to the external thread on the inner sleeve, the inner sleeve having internal teeth adapted to grip the surface of a respective pipe section for securing the inner sleeve thereto when the outer sleeve is threaded onto the inner sleeve, and wherein the clamp means and outer sleeves have cooperable portions for resisting separation of the respective sleeve means and pipe sections.

2. A pipe coupling as defined in claim 1, wherein said sealing means comprises a tubular seal carrier having opposed seal-carrying sections adapted to be inserted in the respective pipe sections, each seal carrying section having an external circumferential seal adapted to engage the interior surface of the respective pipe section.

3. A pipe coupling as defined in claim 3, wherein each of said seals comprises an O-ring seal.

4. A pipe coupling as defined in claim 3, wherein each of said seal-carrying sections includes a tapered outer surface along which the respective O-ring seal may be wedged in response to increases in internal pipe pressure in order to provide a tighter seal against the internal pipe surface.

5. A pipe coupling as defined in claim 2, wherein the seal carrier includes a radially outwardly projecting flange between the seal-carrying sections, said flange providing opposed engagement surfaces for adjacent ends of said outer sleeves.

6. A pipe coupling as defined in claim 5, wherein the cooperable portions of the clamp means and outer sleeves comprise a groove on each outer sleeve and a pair of ribs on the clamp means spaced so as to be received in the respective grooves when the adjacent ends of the outer sleeves engage said flange.

7. A pipe coupling as defined in claim 6, wherein the clamp means comprises a pair of semi-cylindrical portions adapted to fit together around the outer sleeves and fastener means for connecting said portions together.

8. A pipe coupling comprising a tubular seal carrier having opposed seal-carrying sections adapted to enter respective end portions of a pair of pipe sections which are to be coupled and a radially outwardly extending flange between said opposed sections for providing a spacer between adjacent ends of the respective pipe sections, said opposed sections being constructed to carry respective seal members for sealingly engaging the interior surfaces of the respective pipe sections, first and second sleeve means securable about the respective end portions of the pipe sections for gripping said end portions with adjacent ends of the respective sleeve means engaging opposite surfaces of said flange, and clamp means securable about the sleeve means for holding the sleeve means together when the same are secured about the respective end portions of the pipe sections, the clamp means and sleeve means having cooperable formations for resisting separation of the pipe sections.

9. A pipe coupling as defined in claim 8, wherein said cooperable formations comprise an external groove in each of said sleeve means and a pair of internal ribs on the clamp means spaced for receipt in the respective grooves when the adjacent ends of the respective sleeve means engage the opposite surfaces of the flange.

10. A pipe coupling as defined in claim 9, wherein each of said sleeve means comprises an axially slit inner sleeve with a tapered external thread and an outer sleeve with a complementary internal thread, the inner sleeve having internal teeth adapted to grip the surface of a respective pipe section when the outer sleeve is threaded onto the inner sleeve, said external groove being formed in the outer sleeve, and wherein said adjacent ends of the sleeve means include adjacent ends of the outer sleeves.

* * * * *